THERMAL TRANSFER ARRANGEMENT FOR CRYOGENIC DEVICE COOLING AND METHOD OF OPERATION

Filed Sept. 20, 1965

INVENTOR
PATRICK N. BYRD,
BY
[signature]
ATTORNEY

INVENTOR.
PATRICK N. BYRD,
BY
ATTORNEY.

INVENTOR.
PATRICK N. BYRD,
BY
[signature]
ATTORNEY.

United States Patent Office 3,302,429

Patented Feb. 7, 1967

3,302,429

THERMAL TRANSFER ARRANGEMENT FOR CRYOGENIC DEVICE COOLING AND METHOD OF OPERATION

Patrick N. Byrd, Culver City, Calif., assignor to Hughes Aircraft Company, Culver City, Calif., a corporation of Delaware Filed Sept. 20, 1965, Ser. No. 488,339
10 Claims. (Cl. 62—514)

The invention is directed to an arrangement offering efficient thermal transfer to cool an electronic device or the like to cryogenic temperature levels.

Many electronic devices such as parametric amplifiers, require, for efficient operation, that they be contained in an extremely low ambient temperature condition. For example, a typical parametric amplifier diode of the type which may utilize the equipment herein disclosed, may require an ambient temperature level in the range of 25 to 30° K. As used herein, however, the term "cryogenic temperature level" refers generally to temperatures below 100° K. Typically, the electronic device is carried within a housing formed of highly thermally conductive material, the housing being disposed in a container, sometimes referred to as a Dewar, which is gas evacuated to approach a total vacuum and thereby thermally isolate the device containing housing from ambient atmosphere. Conventionally, waveguide structure accommodating energy transmission is in communication with the housing and the contained electronic device.

In order to efficiently cool the housing and electronic device, refrigerating equipment has been developed to accomplish the liquefaction of certain cryogenic gases, such as nitrogen or helium, and thereby provide a refrigerating source within the temperature range required. Typical of such refrigerators is that known in the art as a Stirling cycle multi-staged refrigerator which may be adapted to use helium as a refrigerant.

The herein disclosed invention is directed to a structural arrangement which thermally couples a Stirling cycle refrigerator to the device containing housing. Particularly, the arrangement allows efficient heat transfer between a refrigerator cold finger and the device housing to maintain the latter at a temperature condition required for effective device operation. A first or outer housing is mounted on a Stirling multi-stage refrigerator. A second housing, carried within the outer housing, is thermally coupled with a first stage of the refrigerator. A novel mode of direct physical connection between a second or lower temperature stage of the refrigerator and the device containing housing is provided. Efficient thermal transfer therebetween is accomplished and the structure accommodates relative movement between structural parts which results from the expansion and contraction thereof during the creation of relatively low temperatures.

The invention further is directed to a method of operation to produce a contained vacuum which offers efficient thermal isolation.

These and other features and advantages of the invention will become apparent in the course of the following description and from an examination of the related drawings, wherein.

Figure 1:
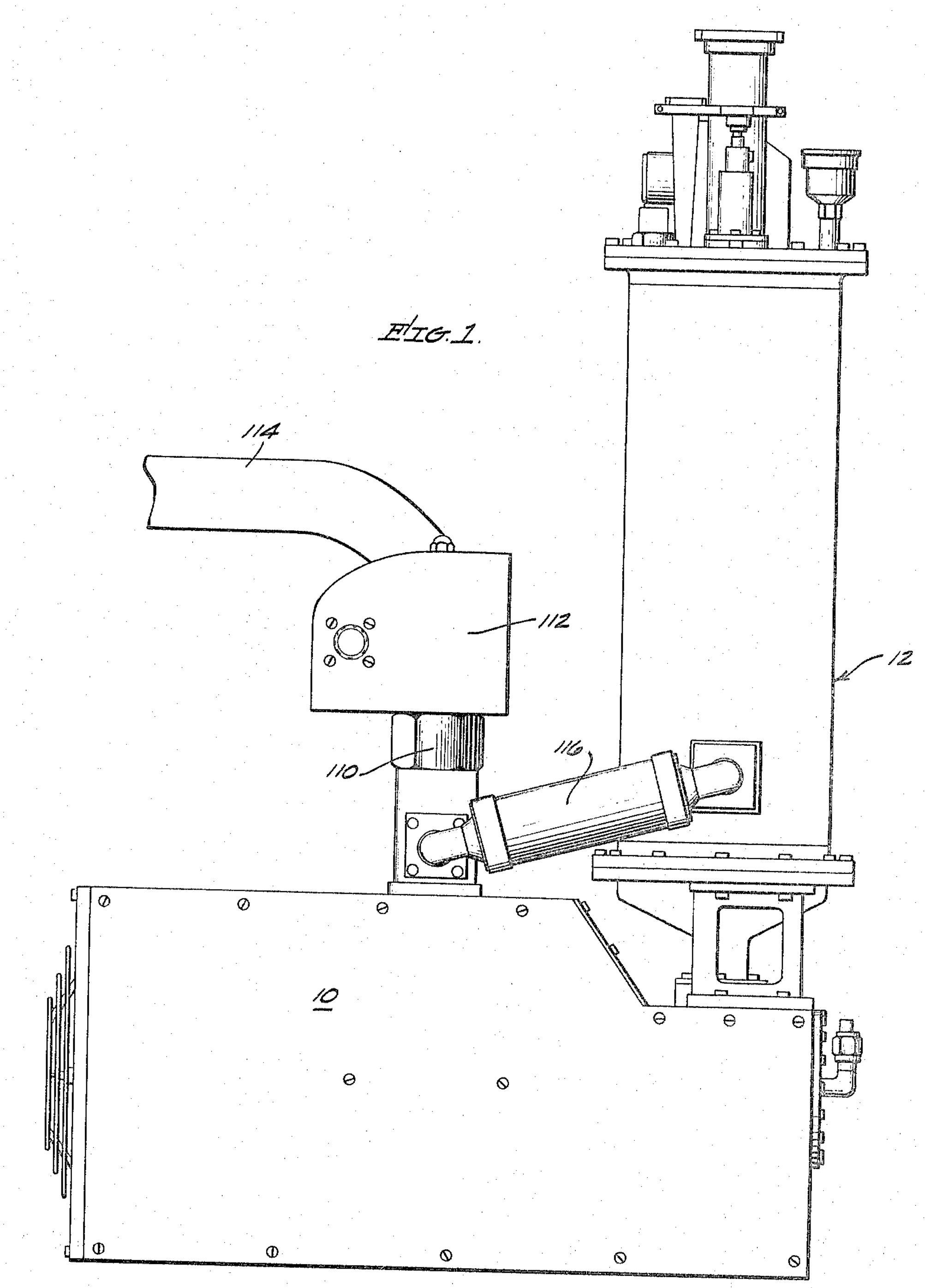
FIG. 1 is a side elevational view of a device embodying the invention.
Figure 2:
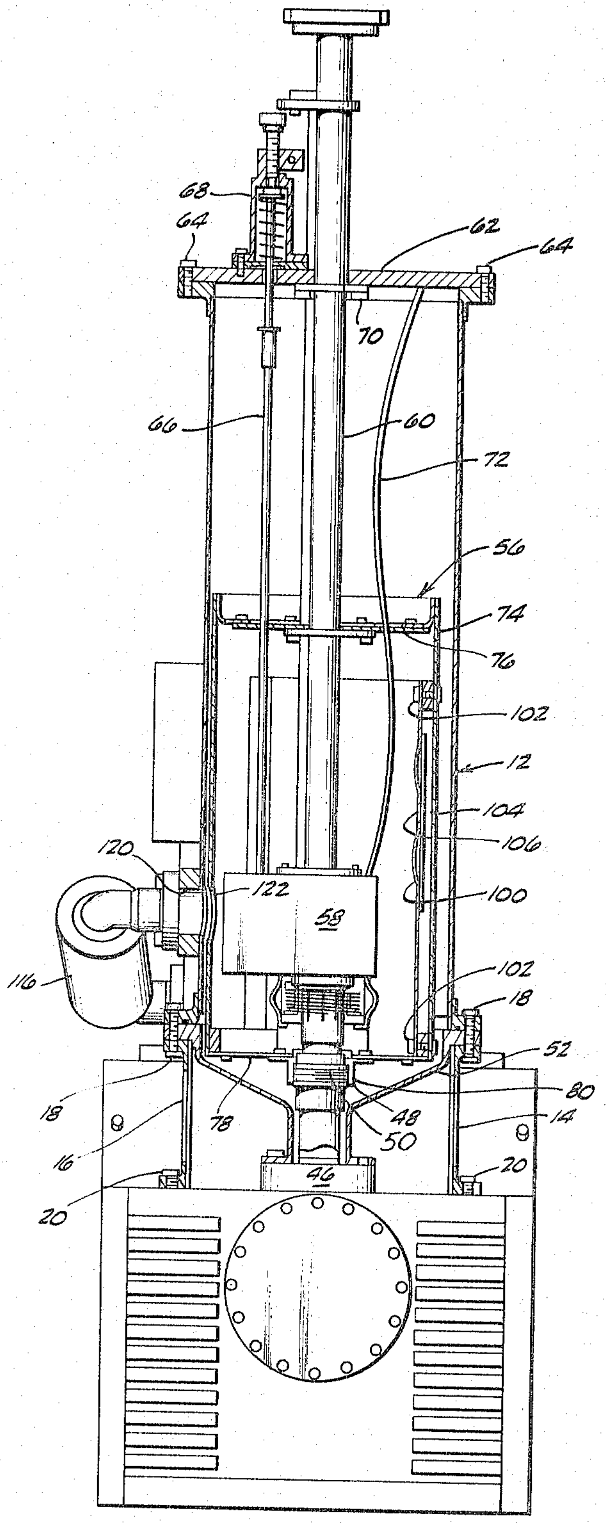
FIG. 2 is a front elevational view, and partially in vertical section of the structure shown in FIG. 1.
Figure 3:
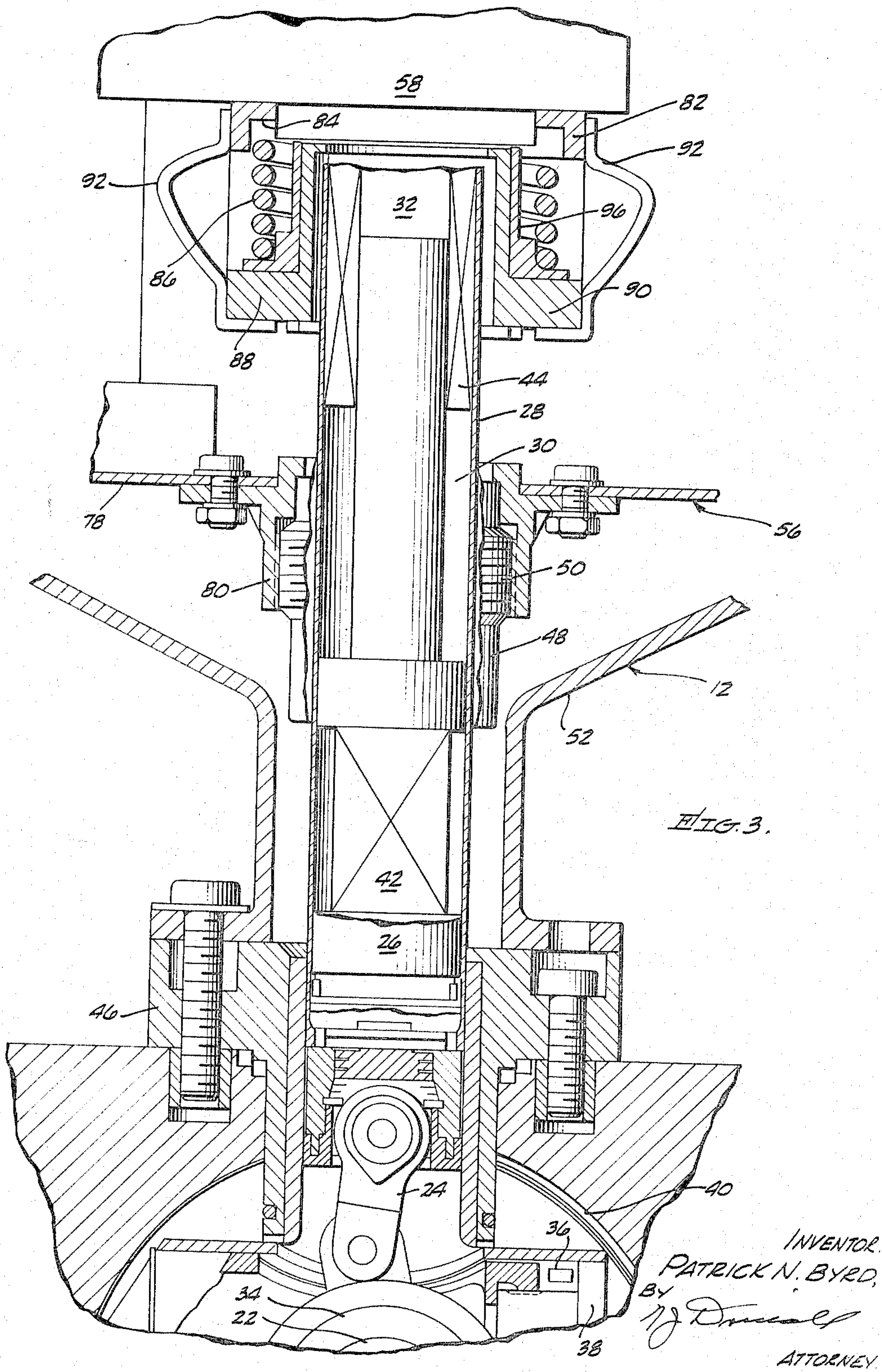
FIG. 3 is an enlarged detail view of the coupling structure.

Describing the invention in detail and directing attention to the drawings, the numeral 10 generally indicates a housing containing a conventional Stirling cycle refrigerator. The refrigerator, per se, is not shown in detail, as the features and mode of operation thereof are well known in the cryogenic field.

An outer container or Dewar housing 12 is mounted on the front aspect of the refrigerator and is secured thereto via brackets 14 and 16, the latter being bolted as at 18, 18 to flanges at the lower aspect of the container 12 and bolted to the refrigerator 10 as at 20, 20. The refrigerator 10 includes a motor driven crank shaft 22 arranged for excentric rotation to reciprocally drive a linkage 24, the latter inducing vertical reciprocal motion of an expander piston 26 within a vertically arranged expansion cylinder 28. The cylinder 28 is sometimes referred to as a "cold finger." In a preferred embodiment of the invention, the piston 26 is provided with varying diameters to offer two-stage expansion chambers 30 and 32. Additional linkage 34 operatively connected to the shaft 22 reciprocally drives a compression piston 36, the latter being disposed for movement within a compression chamber 38. The compression chamber 38 communicates with the expansion chambers via passage 40 and regenerators 42 and 44, the former being carried by the piston 26 and the latter being disposed in the cylinder 28.

A flange 46 is bolted to the refrigerator 10 and defines the lower aspect of cylinder 28. The cylinder 28 projects upwardly from the flange 46 and is provided with a collar 48 which is secured thereto and offers an annular thread 50. End cap 52 is also secured to the flange 46 and provides closure for the related end of the outer cylinder 12. A secondary container or housing, indicated generally at 56, is provided and is telescopically received within the outer container 12. The secondary container is preferably formed of cylindrical highly heat conductive material such as copper, and may be gold plated to act as a radiation shield as hereinafter described. Within the secondary container 56 an electronic device housing 58 is positioned. The housing 58 is preferably hollow (not shown) and the detailed structure thereof is unimportant to the present disclosure. A waveguide element 60 is affixed to the device housing 58 for operative communication therewith in the conventional manner. The waveguide element 60 projects upwardly from the device housing 58 and extends outwardly from the outer housing 12 via an appropriate opening within cover plate 62. Plate 62 is conventionally connected to and sealed to the upper aspect of outer housing 12 as at 64, 64. A linear feedthrough adjustment device 66 is secured to the cap 62 and projects inwardly of the outer cylinder 12 for operative association with the device housing 58. The purpose of the adjustment device is not important with reference to the present disclosure. A sealing bellows 68 is associated with the adjustment device 66 and a sealing plate 70 is associated with the waveguide 60 and cap 62. Thus a vacuum may be maintained with the cylinder 12 as will be hereinafter described. Additionally, an electrical lead 72 may be arranged to conventionally enter the housing 12 for communication with the device (not shown) contained in housing 58.

The container 56 comprises an annular cylinder 74 having a plate structure 76 secured to the upper aspect thereof. The plate structure is in physical contact with waveguide 60 and the feedthrough adjustment device 66 to accommodate thermal transfer therebetween. As earlier noted, the cylinder 74 and related structure are preferably gold plated to provide an appropriate radiation shield. At the lower aspect of the inner container 56, the cylinder 74 is provided with a lower plate 78, the latter centrally mounting a threaded bushing 80. The bushing 80 is threadably secured to the collar 48, providing support for the inner housing 56 from the cylinder 28.

An annular plate 82 abuts and is physically secured to the lower surface of device housing 58. Plate 82 is provided with an indentation 84, the latter complementally receiving one end of spring 86. A collar 88 is provided having an internal diameter to complementally receive the upper end of cylinder 28. The collar 88 is provided with a lower annular flange 90, the latter being pressure engaged by the opposite end of the spring 86. A plurality of thermal straps 92, 92 are physically connected at opposed ends to the plate 82 and the flanges 90 to provide a thermal heat transfer path therebetween. Additionally, the straps 92 are bowed centrally thereof to accommodate limited flexure and thereby allow for limited movement between the collar 88 and plate 82 due to expansion and contraction thereof under the wide range of temperatures to which the arrangement is subjected. Additionally, this arrangement allows blind (no access) assembly of the container 56 to the cold finger within container 12 and isolates the housing 58 from refrigerator 10 vibrations. Plate 82, the collar 88 and the cylinder 28 are preferably formed of a highly thermal conductive material such as copper to provide the efficient heat transfer required in the arrangement. A contraction or secondary collar 96 surrounds collar 88. The collar 96 may be formed of Teflon, the purpose of which will hereinafter be described.

In addition, the inner container 56 is provided with an annular plate 100 secured via bolts and spacers 102, 102 to the inner surface of cylinder 74 to define a space 104 therebetween. The plate 100 is provided with openings 106 which establish communication with the space 104. In a preferred embodiment of the invention, the space 104 is preferably filled with a granular material of the zeolite family. Metallic alumina silicates having a property or ability to adsorb liquid or gas are satisfactory. More commonly, the zeolite materials referred to are known as molecular sieves and the purpose thereof will hereinafter be described in detail.

The refrigerator 10 has a pipe 110 mounted thereon, the latter carrying a conventional solenoid valve 112 which in turn communicates with a pipe 114, the latter being operatively connected to a conventional vacuum pump (not shown). Secondary pipe structure 116 communicates with pipe 110. Both the outer container 112 and the inner container 56 are provided with openings 120 and 122, communicating with pipe 116 so that communication may be established with the noted vacuum pump.

It will be understood by those skilled in the cryogenic refrigerating field that a virtually total vacuum is required to provide the efficient insulating quality necessary for the continued maintenance of the extremely low temperatures involved as, for example, at 25° K. The conventional vacuum pumps alone are not capable of producing the degree of vacuum required. After container evacuation by a conventional pump, the minor degree of atmospheric gas remaining in the container results in an excessive thermal loss, making it extremely difficult to maintain the low temperature levels required.

The conventional vacuum pump (not shown) is initially operated to evacuate most of the atmosphere from the container 12 via pipes 116 and 114. The solenoid valve 112 is then closed and the container 12 sealed.

The refrigerator 10 is then operated and the refrigerant in the expander chambers 30 and 32, produces a first stage temperature of about 60° K. at chamber 30 and a second stage temperature of about 25° K. at chamber 32. It is noted that the chamber 30 is physically located adjacent the collar 48 and flange 80. Thus a heat transfer path is provided via bottom plate 78, cylinder 74 and top plate 76 to receive and cool heat moving down the waveguide 60 and the linear feedthrough adjusting device 66. In effect, the heat is shunted to the first stage chamber 30. Additionally, the cylinder 74, being gold plated, captures radiant energy moving from ambient through the outer housing 12 and shunts same to the first stage refrigerating expanding chamber 30. The effect of the structure noted is to lower the temperature of the cylinder 74 to slightly above the temperature level developed in the first stage expansion chamber or slightly above 60° K. At this temperature level, the remaining molecules of air, primarily, nitrogen and oxygen, in container 12 condense on the surface of plate 100 and are brought into physical contact with the molecular sieve material in opening 104. The material adsorbs the condensed gas. This secondary action achieves a substantially total vacuum within the cylinder 12. Thus an effective vacuum insulation and thermal isolation of device housing 58 is achieved.

At the second expansion stage at chamber 32 a temperature level of approximately 25° K. is obtained. Because of high vacuum thermal transfer is entirely dependent upon direct conduction. The efficiency of conductive heat transfer is directly related to contact pressure existing between engaging surfaces. The refrigerating effect of the second expansion stage at chamber 32 passes through the interface between cylinder 28 and collar 88. In order to provide efficient heat transfer through this interface, the secondary collar 96 is provided. The collar 96 is preferably formed of a material having a coefficient of contraction at extremely low temperatures greater than the contraction coefficient of the collar 88. As noted, Teflon has been found to be an appropriate material. As the extremely low temperature is developed within the second expansion stage, the collar 96 is subjected to a degree of contraction greater than the collar 88, forcing the latter into pressured engagement with the adjacent cylinder 28 and thus providing efficient heat transfer therebetween. The transfer straps 92 then accommodate heat transfer between the collar 88 and the plate 82. The plate 82 cools device housing 58 by virtue of the physical connection thereto. Thus the housing 58 is maintained at an ambient condition desired for efficient operation of the electronic device contained therein.

The steps utilized to achieve a vacuum level within the container 12 should be noted. Specifically, a conventional vacuum pump is used to initially gas evacuate the container. Thereafter, the refrigerating effect of the first expanding stage is utilized to induce condensation of the gas molecules remaining in the container 12 by cooling cylinder 74 and plate 100. The condensed molecules are then adsorbed by the granulated molecular sieve material.

The invention as described is by way of illustration and not limitation and may be modified in many respects, all within the scope of the appended claims.

What is claimed is:

1. In a thermal coupling arrangements for disposition within a vacuum container to thermally interconnect the cold finger of a cryogenic refrigerator and a device containing housing disposed within the container, the combustion of a waveguide establishing communication between the ambient atmosphere and the device housing, a second container disposed within said first container and in heat transfer connection with the waveguide, said cold finger comprising two stages of refrigeration creating different temperature levels, said second container being connected to said first stage to shunt heat energy transmitted to the container by said waveguide to said first stage, and coupling means interconnecting said second stage and said device housing.

2. A thermal coupling arrangement according to claim 1, wherein said coupling means comprises a first collar loosely and telescopically receiving the second stage of said expansion finger at ambient temperature levels, a plate spaced from the first collar and in abutting engagement with said device housing, flexible heat transfer elements interconnecting the plate and collar, spring means interposed between plate and the collar, and a second collar surrounding said first collar and having a coefficient of expansion and contraction different from said first collar whereby said second collar contracts and pressure forces said first collar into surface engagement with said cold finger as cryogenic temperature levels are reached to thereby reduce the thermal loss at the interface between the first collar and the cold finger.

3. In a thermal coupling arrangement for thermal transfer association with a cryogenic refrigerator, the combination of a cold finger forming a part of the refrigerator and having refrigerant expansion means to create a refrigerating effect, housing means adapted to contain an electronic device, means communicating with the housing means for conveying an energy signal thereto, a sealed container surrounding said housing means, means to create a vacuum in the container to thereby insulate said housing means from ambient atmosphere, thermal transfer means associated with the finger and operative to lower the temperature of the housing means to a cryogenic level in response to the created refrigerating effect being transferred to the housing means, said thermal transfer means including coupling means directly interconnecting the cold finger and the housing, said coupling means including means accommodating relative movement between the cold finger and housing due to variation in the expansion and contraction thereof as the temperature level is varied.

4. A thermal coupling arrangement according to claim 3, wherein said expansion means comprises a first stage operative to create a refrigerating effect at a first temperature level and a second stage operative to create a refrigerating effect at a second and lower temperature level.

5. A thermal coupling arrangement according to claim 4, and including a second container disposed within the first-mentioned container and directly connected to said first stage to provide thermal transfer therebetween, said housing means being disposed in said second container, the direct connection between said first stage and said second container being operative to shunt heat received by the second container from ambient atmosphere directly to the first stage.

6. A thermal coupling arrangement according to claim 5, wherein said coupling means comprises a first collar formed and arranged for slip-fit association with the cold finger at ambient temperature levels, a plate spaced from the collar and abutting said housing means, and heat transfer elements connected to the plate and collar, respectively, to accommodate thermal transfer therebetween.

7. A thermal coupling arrangement according to claim 6, wherein said elements comprise metallic strips formed for flexural movement to accommodate relative movement between the plate and collar, and resilient means interconnecting the plate and collar.

8. A thermal coupling arrangement according to claim 7, and including a second collar engaging the first collar, said collars being formed of materials having different coefficients of expansion and contraction whereby said second collar pressure forces said first collar into engagement with the finger as cryogenic temperature levels are reached to thereby reduce thermal loss at the interface between the finger and first collar.

9. In a coupling arrangement to accommodate heat transfer between a cryogenic refrigerator cold finger and a housing containing an electronic device, a collar adapted for slip-fit association with a cold finger at non-refrigerating temperatures, a plate spaced from the collar and abutting said device housing, heat transfer element means having opposed ends thereof connected to the plate and collar respectively, said element means being flexible to accommodate relative movement between the plate and collar as a result of temperature level changes inducing expansion and contraction of the arrangement, a second collar in surface engagement with the first collar, said first and second collars having different coefficients of expansion and contraction whereby said second collar pressure urges said first collar into surface engagement with the cold finger as low temperature levels are reached to thereby reduce the thermal loss at the interface between the first collar and the cold finger.

10. A thermal coupling arrangement according to claim 9, and including spring means operatively interposed between and in pressured engagement with the first collar and the plate, said element means comprising bowed metallic strips.

References Cited by the Examiner

UNITED STATES PATENTS

| | | | |
|---|---|---|---|
| 2,909,908 | 10/1959 | Pastuhou et al. | 62—514 |
| 2,951,944 | 9/1960 | Fong | 62—514 |
| 2,967,961 | 1/1961 | Heil | 62—514 |
| 3,006,157 | 10/1961 | Haettinger et al. | 62—514 |
| 3,064,451 | 11/1962 | Skinner | 62—514 |
| 3,066,222 | 11/1962 | Poorman et al. | 62—514 X |
| 3,195,620 | 7/1965 | Steinhardt | 62—514 |

LLOYD L. KING, *Primary Examiner.*